United States Patent [19]

Wakabayashi et al.

[11] Patent Number: 5,115,014
[45] Date of Patent: May 19, 1992

[54] SILYL GROUP-CONTAINING VINYL RESIN AND CURABLE COMPOSITION

[75] Inventors: Hiroshi Wakabayashi; Joe Kawamura, both of Kobe, Japan

[73] Assignee: Kanegafuchi Kagaku Kogyo Kabushiki Kaisha, Osaka, Japan

[21] Appl. No.: 749,514

[22] Filed: Aug. 19, 1991

Related U.S. Application Data

[60] Continuation of Ser. No. 449,481, Dec. 18, 1989, abandoned, which is a continuation of Ser. No. 129,337, Dec. 3, 1987, abandoned, which is a division of Ser. No. 845,293, Mar. 28, 1986, abandoned.

[30] Foreign Application Priority Data

Mar. 30, 1985 [JP]  Japan .................................. 60-67890

[51] Int. Cl.$^5$ ............................................. C08F 130/08
[52] U.S. Cl. ..................................... 524/506; 524/535; 525/100; 525/288; 526/279
[58] Field of Search ................. 525/100, 288; 526/279; 524/506, 535

[56] References Cited

U.S. PATENT DOCUMENTS

| | | | |
|---|---|---|---|
| Re. 24,906 | 8/1958 | Ulrich | 526/279 |
| 3,814,716 | 6/1974 | Kowalski et al. | 526/279 |
| 4,026,826 | 5/1977 | Yoshida et al. | |
| 4,112,213 | 9/1978 | Waldman | 526/279 |
| 4,419,505 | 12/1983 | Ratkowski et al. | 526/279 |
| 4,491,650 | 1/1985 | Rizk et al. | 526/279 |
| 4,614,777 | 9/1986 | Kunia | 526/279 |

*Primary Examiner*—Bernard Lipman
*Attorney, Agent, or Firm*—Armstrong & Kubovcik

[57] ABSTRACT

A silyl group-containing vinyl resin having a molecular weight of 500 to 100,000, the main chain of which is substantially composed of a vinyl polymer, and which has per one molecule at least one silicon atom to which a hydrolyzable group is bonded, and which has 1 to 95% by weight of units of a monomer selected from the group consisting of an acrylic acid alkyl ester and a methacrylic acid alkyl ester, said alkyl having not less than 10 carbon atoms, which has an excellent abrasion resistance and scratch resistance, and a curable composition containing the silyl group-containing vinyl resin.

14 Claims, No Drawings

SILYL GROUP-CONTAINING VINYL RESIN AND CURABLE COMPOSITION

This application is a continuation of application Ser. No. 449,481, filed on Dec. 18, 1989, now abandoned which is a continuation of Ser. No. 129,337, filed on Dec. 3, 1987, now abandoned which is a divisional of Ser. No. 845,293, filed on Mar. 28, 1986 now abandoned.

BACKGROUND OF THE INVENTION

The present invention relates to a vinyl resin having improved properties and a curable composition containing the vinyl resin, and more particularly to a silyl group-containing vinyl copolymer having a molecular weight of 500 to 100,000, the main chain of which is substantially composed of a vinyl polymer, and which has per one molecule at least one silicon atom to which a hydrolyzable group is bonded, and which has a monomer selected from the group consisting of an acrylic acid alkyl ester and a methacrylic acid alkyl ester, the alkyl having not less than 10 carbon atoms.

Japanese Unexamined Patent Publication (Tokkyo Kokai) No. 36395/1979 discloses that a vinyl resin including a silyl group having a hydrolyzable group at the molecular ends or side chains not only has excellent glossiness, weatherability, discoloration resistance, and the like, which are characteristics of the vinyl resin itself, but also has an improved adhesion resulting from the hydrolyzable silyl group and forms a resin having excellent solvent-resistance, water-resistance, heat-resistance and weatherability and high hardness by causing a cross-linking reaction with water, particularly water in the atmosphere, even at ordinary temperature to form a fine network structure.

The present inventors have found that the properties of the silyl group-containing vinyl resin can be extremely improved by copolymerizing (meth)acrylic acid alkyl ester having not less than 10 carbon atoms with the silyl group-containing vinyl copolymer.

One of the properties improved by copolymerizing the (meth)acrylic acid ester is the abrasion resistance. The above-mentioned silyl group-containing vinyl resin is excellent in the abrasion resistance and scratch resistance in comparison with other commercially available resins since the silyl group-containing vinyl resin can be crosslinked to form a fine network structure at ordinary or low temperature or at high temperature in a short time in the state of presence or absence of a catalyst.

Furthermore, the inventors have found that the abrasion resistance and the scratch resistance are extremely improved when subjecting the above-mentioned (meth)acrylic acid alkyl ester to the copolymerization.

In the present invention, the improvement of the adhesion is a large characteristic.

The silyl group-containing vinyl resin which is disclosed in the above publication contains a hydrolyzable silyl group and accordingly, the vinyl resin is excellent in the adhesion to an inorganic material as shown in case that usual silane coupling reagents are admixed. However, the vinyl resin is insufficient in the adhesion to an organic substance. When copolymerizing a (meth)acrylic acid higher alkyl ester with the silyl group-containing vinyl resin, the adhesion to an inorganic substance is further increased and the adhesion to an organic substance is largely improved Accordingly, the silyl group-containing vinyl resin of the invention can be preferably employed in not only paints, coatings or adhesive agents used for inorganic materials but also the top coatings of organic materials such as wood, paper, plastic materials and organic paints.

SUMMARY OF THE INVENTION

In accordance with the present invention, there is provided a silyl group-containing vinyl resin having a molecular weight of 500 to 100,000, the main chain of which is substantially composed of a vinyl polymer, and which has per one molecule at least one silicon atom to which a hydrolyzable group is bonded, and which has 1 to 95% by weight of units of a monomer selected from the group consisting of an acrylic acid alkyl ester and a methacrylic acid alkyl ester, the alkyl having not less than 10 carbon atoms.

DETAILED DESCRIPTION

The silyl group-containing vinyl resin of the present invention can be prepared by various processes. Among them, (A) a process that a vinyl resin having double bonds between carbon atoms and hydrosilane are subjected to hydrosilylation, and (B) a process that a vinyl compound and a silyl compound having a polymerizable double bond are subjected to copolymerization are industrially preferable.

In the above-mentioned process (A) the silyl group-containing vinyl resin of the present invention can be easily prepared by reacting a hydrosilane compound with a vinyl resin having units of (meth)acrylic acid ester and double bonds between carbon atoms in the presence of a catalyst of a transition metal (VIII).

The hydrosilane compound used in the present invention has the following formula:

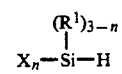

wherein $R^1$ is a group selected from the group consisting of an alkyl group having 1 to 10 carbon atoms, an aryl group having 1 to 10 carbon atoms and an aralkyl group having 1 to 10 carbon atoms; X is a group selected from the group consisting of a halogen atom, an alkoxy group, an acyloxy group, an aminooxy group, a phenoxy group, a thioalkoxy group and an amino group, and n is an integer of 1 to 3.

Examples of the hydrosilane compound shown by the above formula are, for instance, halogenated silane compounds such as methyldichlorosilane, trichlorosilane and phenyldichlorosilane; alkoxysilane compounds such as methyldiethoxysilane, methyldimethoxysilane, phenyldimethoxysilane, trimethoxysilane and triethoxysilane; acyloxysilane compounds such as methyldiacetoxysilane, phenyldiacetoxysilane and triacetoxysilane and other silane compounds such as methyldiaminoxysilane, triaminoxysilane, methylaminosilane and triaminosilane, and the like.

Any amount of the hydrosilane compound can be used against the double bond between carbon atoms in the vinyl resin, but it is preferable that the amount is 0.5 to 2 moles per mole of the double bond. When the amount is more than 2 moles, the hydrosilane compound is not completely reacted with the double bond and a little amount of it is left.

In the present invention the catalyst of a transition metal complex is needed for the reaction of the hydrosilane compound and the double bond between carbon atoms in the silyl group-containing vinyl resin As the catalyst of the transition metal complex, a transition metal complex compound (VIII) selected from platinum, rhodium, cobalt, paladium and nickel is effectively used. The hydrosilylation reaction is carried out at a temperature of 50° to 130° C. for about 1 to about 10 hours.

In the present invention, halogenated silanes can be easily used as hydrosilane compounds since the halogenated silanes are inexpensive and have a high reactivity. When the halogenated silanes are used for the preparation of a silyl group-containing vinyl resin, the obtained silyl group-containing vinyl resin is rapidly cured at room temperature in air while producing hydrogen chloride However, since there are some problems as for the irritating odor and the corrosion depending on hydrogen chloride, the use of the obtaining silyl group-containing vinyl resin is limited Therefore, it is preferable that the halogen atom of the obtained silyl group-containing vinyl resin is further converted into other hydrolyzable functional group. Examples of the hydrolyzable groups are, for instance, an alkoxy group, an acyloxy group, an aminooxy group, a phenoxy group, a thioalkoxy group, an amino group, and the like.

The exemplified methods for converting the halogen atom into the above-mentioned hydrolyzable functional group are, for instance, a method that alcohols such as methanol, ethanol, 2-methoxyethanol, sec-butanol and tert-butanol; phenols such as phenol; salts of alcohols or phenols with alkali metal; or alkyl orthoformate such as methyl orthoformate and ethyl orthoformate are reacted with the halogen atom.

The exemplified method for converting the halogen atom into an acyloxy group is a method that carboxylic acids such as acetic acid, propionic acid and benzoic acid; or salts of carboxylic acid with alkali metal are reacted with the halogen atom.

The exemplified method for converting the halogen atom into an aminooxy group is a method that hydroxylamines such as N,N-dimethylhydroxylamine, N,N-diethylhydroxylamine, N,N-methylphenylhydroxylamine and N-hydroxypyrrolidine; or salts of hydroxylamine with alkali metal are reacted with the halogen atom.

The exemplified method for converting the halogen atom into an amino group is a method that primary amines such as pyrrolidine; secondary amines such as N,N-dimethylamine or N,N-diethylamine; or salts of primary amines or secondary amines with alkali metal are reacted with the halogen atom.

The exemplified method for converting the halogen atom into a thioalkoxy group is a method that thioalcohols such as ethyl mercaptan; thiophenols such as thiophenol; salts of thioalcohols or thiophenols with alkali metal are reacted with the halogen atom.

When the silyl group is introduced into a vinyl resin by the hydrosilylation reaction, not only a halogen atom but also an alkoxy group, an acyloxy group, or the like in the silyl group can be converted into other hydrolyzable functional group such as amino or aminooxy group in case of need.

When the hydrolyzable functional group in the silyl group is directly converted into other hydrolyzable functional group by the hydrosilylation reaction, it is preferable that the above-mentioned conversion reaction is carried out at a temperature of 50° to 150° C. The conversion reaction can be carried out whether a solvent is present or not. When the reaction is carried out in a solvent, unreactive solvents such as ethers, hydrocarbons or acetic esters are preferably employed.

The vinyl resins are not particulary limited unless the vinyl resins have a (meth)acrylic ester which has a higher alkyl group having not less than 10 carbon atoms as the essential comonomer. As a compound for preparing the vinyl resin, there is exemplified, for instance, an acrylic acid ester such as methyl acrylate or butyl acrylate; a methacrylic acid ester such as methyl methacrylate or butyl methacrylate; a monomer having amide group such as acrylamide, methacrylamide, N-methylolacrylamide or N-methylolmethacrylamide; a monomer having epoxy group such as glycidyl acrylate or glycidyl methacrylate; a monomer having amino group such as diethylaminoethyl acrylate, diethylaminoethyl methacrylate or aminoethyl vinyl eter; acrylonitrile, iminol methacrylate, styrene, α-methyl styrene, alkyl vinyl ether, vinyl chloride, vinyl acetate, vinyl propionate, ethylene, and the like. The compounds may be employed alone or in admixture thereof.

When the polymer or copolymer of the above-mentioned vinyl compounds (the vinyl resin) is prepared, a double bond between carbon atoms can be introduced into the vinyl resin by radical-copolymerizing a monomer such as allyl acrylate, allyl methacrylate or diallyl phthalate. The amount of the above-mentioned monomer is suitably determined in accordance with the number of silyl groups in the desired silyl group-containing vinyl resin In general, it is preferable that the molecular weight of the above-mentioned monomer is 300 to 4,000 per one silyl group. Also, in order to obtain a silyl group-containing vinyl resin having a molecular weight of 500 to 100,000, a chain transfer agent such as α-dodecyl mercaptan or t-dodecyl mercaptan may be added as occasion demands The vinyl resin can be prepared whether a solvent is present or not. In case of using a solvent, unreactive solvents such as ethers, hydrocarbons or acetic acid esters are preferably used. In the invention, the (meth)acrylic acid alkyl ester having not less than 10 carbon atoms is not particularly limited, and the (meth)acrylic acid alkyl ester is selected in accordance with the desired solubility or polymerizability of the estr of the desired appearance or properties of the film prepared from the silyl group-containing vinyl resin. Usually, a (meth)acrylic acid alkyl ester having 10 to 30 carbon atoms can be preferably used.

Examples of the methacrylic acid ester are, for instance, lauryl methacrylate: $CH_2=C(CH_3)COOC_{12}H_{25}$, tridecyl methacrylate: $CH_2=C(CH_3)COOC_{13}H_{27}$, methacrylate: $CH_2=C(CH_3)COOC_{16}H_{33}$, stearyl methacrylate: $CH_2=C(CH_3)COOC_{18}H_{37}$, $CH_2=C(CH_3)COOC_{22}H_{45}$, and the like. Also, a mixture of the methacrylic acid esters having 2 kinds of alkyl groups can be employed. Examples of the mixture are, for instance, a mixture of an alkyl methacrylate which has an alkyl group having 12 carbon atoms and an alkyl methacrylate which has an alkyl group having 13 carbon atoms (Acry ester SL made by Mitsubishi Rayon Company Limited); alkyl methacrylates which can be easily obtained as a mixture which has alkyl groups having 9 to 11 carbon atoms; and the like.

Examples of acrylic acid ester are, for instance, tridecyl acrylate ($CH_2=CHCOOC_{13}H_{27}$), stearyl acrylate: ($CH_2=CHCOOC_{18}H_{37}$), a mixture of an acrylic acid alkyl ester which has an alkyl group having 12 carbon atoms and an acrylic acid alkyl ester which has an alkyl group having 13 carbon atoms, and the like.

The content of higher (meth)acrylalic acid alkyl ester in a silyl group-containing vinyl resin is within the range of 1 to 95% by weight, and the content can be adjusted in accordance with the desired use or properties of the silyl group-containing vinyl resin within the above-mentioned range. The preferable content is 5 to 50% by weight.

Another method for preparing a silyl group-containing vinyl resin (B) is that a silane compound having the formula:

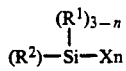

wherein $R^1$ is a monovalent hydrocarbon group having 1 to 10 carbon atoms selected from the group consisting of an alkyl group, an aryl group and an aralkyl group; $R^2$ is an organic residue having a polymerizable double bond; X is a halogen atom or a group selected from the group consisting of an lkoxy group having 1 to 10 carbon atoms, an acyloxy group, aminooxy group, phenoxy group, thioalkoxy group having 1 to 12 carbon atoms and amino group and n is an integer of 1 to 3, a vinyl compound and the higher (meth)acrylic acid alkyl ester are subjected to radical copolymerization.

Examples of the silane compound used in the present invention are, for instance,

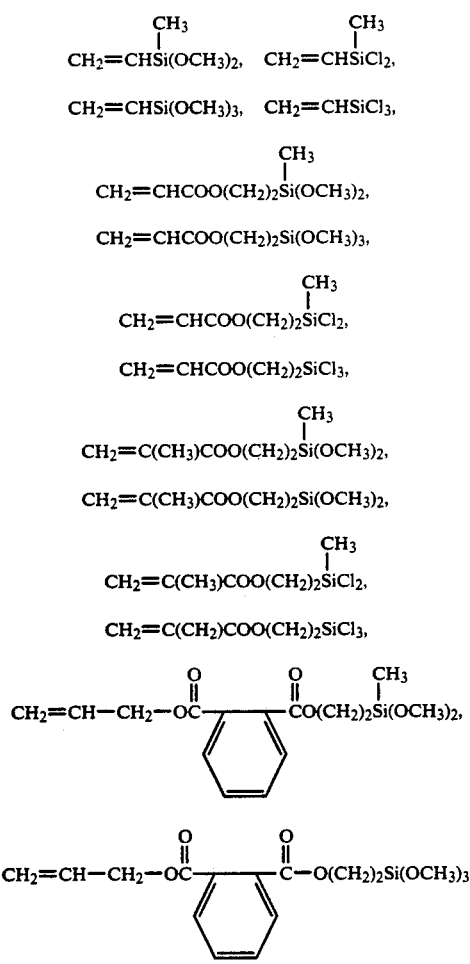

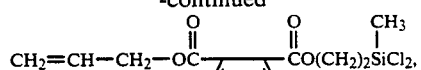

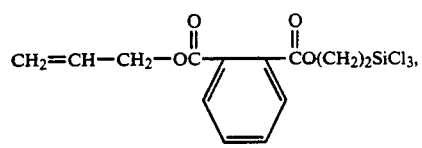

and the like.

The silane compounds can be prepared by various methods, for instance, a method that methyldimethoxysilane or methyldichlorosilane is reacted with acetylene, aryl acrylate, aryl methacrylate or diaryl phthalate in the presence of a catlyst of a transistion methal (VIII).

It is preferable that the molecular weight of the silane compound is usually adjusted within the range of 300 to 4000 per one silyl group.

As the vinyl compound used in the invention, there can be employed a vinyl compound having a hydroxyl group such as 2-hydroxyethyl acrylate, 2-hydroxyethyl methacrylate, 2-hydroxypropyl acrylate, 2-hydroxypropyl methacrylate or 2-hydroxyvinyl ether other than the compounds used at time of the preparation of a vinyl resin in the above-mentioned method (A).

The vinyl compound and the silane compound are copolymerized in a usual solution polymerization method. The vinyl compound, the silane compound, a radical initiator and, if necessary, a chain transfer agent such as n-dodecyl mercaptan or t-dodecyl mercaptan in order to obtain the silyl group-containing vinyl resin having a molecular weight of 500 to 100,000 are reacted at a temperature of 50° to 150° C.

The copolymerization reaction can be carried out in the presence or absence of a solvent Examples of the suitable solvent are, for instance, unreactive solvents such as ethers, hydrocarbons and acetic acid esters.

The hydrolyzable group in the thus obtained silyl group-containing vinyl resin can be converted to other hydrolyzable group in the same manner as in the above-mentioned hydrosilylation reaction.

The silyl group-containing vinyl resin of the invention can be formed a network structure to cure at ordinary temperature by exposing to the atmosphere. It is necessary that the kind of the hydrolyzable group in the silyl group-containing vinyl resin is carefully selected when using the silyl group-containing vinyl resin, since the curing rate varies in accordance with the atmosphere temperature, the relative humidity or the kind of the hydrolyzable group.

The silyl group-containing vinyl resin is cured in the presence or absence of a curing catalyst in accordance with the curing conditions.

However, it is practical to use a curing catalyst in order to satisfy the desired property such as a high curability or the desired workability such as a curability at ordinary temperature.

The curable composition of the invention is not limited to the kind of curing catalysts Examples of the curing catalyst are, for instance, an organotin compound, an acid phospholic ester, a reactant of acid phospholic ester and amine, a saturated or unsaturated polyvalent carboxylic acid or an anhydride thereof, an organotitanium compound, and the like In general, it is preferable that the curing catalyst is used in the amount of not more than 20% by weight based on the silyl group-containing vinyl resin.

The silyl group-containing vinyl resin of the invention is useful for paints or coating agents since the vinyl resin can be cured at ordinary temperature or low temperature. In fact, the vinyl resin can be rapidly cured at ordinary temperature to give a film having an excellent glossy surface as is shown in Examples.

In case that a delustered film is needed, usual delustering agent can be added in the curable composition.

The composition of the invention is not limited to the kind of the delustering agent. Examples of the delustering agent are, for instance, a silica delustering agent, a polyethylene wax delustering agent, a polycarbonate delustering agent, a polypropylene wax delustering agent, and the like.

The amount of the delustering agent is 0.5 to 20 parts by weight based on 100 parts by weight of the silyl group-containing vinyl resin.

Also, the properties of the composition, e.g. the surface hardness, can be improved by adding a compound (e.g. ethylsilicate) which is condensation polymerizable with the silyl group-containing vinyl resin of the invention to the vinyl resin.

Moreover, silyl group-containing vinyl resin can be blended with various resins used for paints or coating agents, and it can improve the properties such as adhesion or weatherability of the paints or coating agents.

Various kinds of fillers or pigments can be blended with the silyl group-containing vinyl resin of the present invention. Examples of the fillers or pigments are, for instance, silicas, calcium carbonate, magngsium carbonate, titanium dioxide, iron oxide, glass fibers, and the like. The thus obtained composition of the invention is useful for not only the above-mentioned paints or coating agents but also coating compositions used for airplanes, buildings, automobiles or glasses; compositions for sealing; a surface treating agent used in inorganic or organic substances.

The present invention is more specifically described and explained by means of the following Examples in which all percents and parts are by weight unless otherwise noted. It is to be understood that the present invention is not limited to the Examples, and various changes and modifications may be made in the invention without departing from the spirit and scope thereof

PREPARATION EXAMPLE 1

A solution in which 2 g of azobisisobutyronitrile was dissolved in 30 g of styrene, 26 g of γ-methacryloxypropyltrimethoxysilane, 52 g of methyl methacrylate, 27 g of butyl acrylate, 4 g of acrylamide and 0.7 g of n-dodecylmercaptan was added dropwise to 90 g of xylene heated up to 90° C. and the mixture was carried out for 10 hours to give a silyl group-containing vinyl resin having a number average molecular weight of 15,000.

PREPARATION EXAMPLE 2

A solution in which 2 g of azobisisobutyronitrile was dissolved in 26 g of stearyl methacrylate, 17 g of styrene, 26 g of γ-methacryloxypropyltrimethoxysilane, 39 g of methyl methacrylate, 27 g of butyl acrylate, 4 g of acrylamide and 0.7 g of n-dodecylmercaptan was added dropwise to 90 g of xylene heated up to 90° C. and the mixture was carried out for 10 hours to give a silyl group-containing vinyl resin having a number average molecular weight of 15,000.

PREPARATION EXAMPLES 3 to 7

The silyl group-containing vinyl resins shown in Table 1 were prepared in the same manner as in Preparation Example 1 or 2. The polymerization reactions were carried out for 10 hours at 90° C.

PREPARATION EXAMPLES 8 to 13

The silyl group-containing vinyl resins shown in Table 2 were prepared in the same manner as in Preparation Example 1 or 2 by employing the (meth)acrylic acid alkyl esters shown in Table 2.

TABLE 1

| Pre. Ex. No. | 3 | 4 | 5 | 6 | 7 |
|---|---|---|---|---|---|
| Stearyl methacrylate (g) | — | 26 | 39 | 7.0 | 13 |
| Percentage of stearyl methacrylate in all monomers (%) | — | 19 | 28 | 5.0 | 9.4 |
| Styrene (g) | 43 | 17 | 10 | 17 | 17 |
| Methyl methacrylate (g) | 65 | 52 | 39 | 58 | 52 |
| Butyl acrylate (g) | 27 | 27 | 21 | 27 | 27 |
| γ-Methacryloxypropyltrimethoxysilane (g) | 13 | 13 | 26 | 26 | 26 |
| Acrylamide (g) | 4 | 4 | 4 | 4 | 4 |
| n-Dodecylmercaptan (g) | 0.7 | 0.7 | 0.7 | 2 | 0.7 |
| Azobisisobutyronitrile (g) | 2 | 2 | 2 | 2 | 2 |
| Xylene (g) | 90 | 90 | 90 | 90 | 90 |
| Molecular weight of the product ($\times 10^3$) | 15 | 15 | 15 | 15 | 15 |

TABLE 2

| Pre. Ex. No. | 8 | 9 | 10 | 11 | 12 | 13 |
|---|---|---|---|---|---|---|
| (Meth)acrylic acid alkyl ester (g) | Tridecyl metyacrylate 13 | Tridecyl methacrylate 26 | Lauryl methacrylate 13 | Lauryl methacrylate 26' | Stearyl acrylate 13 | Stearyl acrylate 26 |
| Percentage of (meth)acrylic acid alkyl ester in all monomers (%) | 9.4 | 19 | 9.4 | 19 | 9.4 | 19 |
| Styrene (g) | 17 | 17 | 17 | 17 | 17 | 17 |
| Methyl methacrylate (g) | 52 | 39 | 52 | 39 | 52 | 39 |
| Butyl acrylate (g) | 27 | 27 | 27 | 27 | 27 | 27 |
| γ-Methacryloxypropyltrimethoxysilane (g) | 26 | 26 | 26 | 26 | 26 | 26 |
| Acrylamide (g) | 4 | 4 | 4 | 4 | 4 | 4 |
| n-Dodecylmercaptan (g) | 0.7 | 0.7 | 0.7 | 0.7 | 0.7 | 0.7 |
| Azobisisobutyronitrile (g) | 2 | 2 | 2 | 2 | 2 | 2 |
| Xylene (g) | 90 | 90 | 90 | 90 | 90 | 90 |
| Molecular weight of | 15 | 15 | 15 | 15 | 15 | 15 |

TABLE 2-continued

| Pre. Ex. No. | 8 | 9 | 10 | 11 | 12 | 13 |
|---|---|---|---|---|---|---|
| the product ($\times 10^3$) | | | | | | |

Examples 1 to 14 and Comparative Examples 1 to 5

The curing catalysts and additive agents shown in Table 3 and 4 were admixed with the silyl group-containing vinyl resins which were prepared in Preparation Examples 1 to 13. The thus obtained solution was diluted with xylene to give a preferable viscosity for painting, and then was sprayed on a commercially available printed plywood made of polyester resin to give test pieces.

The test pieces were dried at a room temperature for one day when they were subjected to scratch resistance test, or at a room temperature for 7 days when they were subjected to abrasion resistance test or adherence test. Adherence test:

The test piece was cut to form 100 squares each having a size of 1×1 mm and the procedure of adhesion-peeling off of cellophane adhesive tape was conducted example, when there is no peeled square, the mark is 10, and when there is no adhered square, the mark is 0.

Abrasion resistance test

The canvas fixed on the contact portion of an eraser-abrader was put on the test piece, and the pressure of 1 Kg/cm² was added on the contact portion and the contact portion was reciprocated for 1000 times Then the reciprocated surface of the test piece was observed.
O: Little change
Δ: A slight abrasions or scratches
X: Remarkable abrasions and scratches Scratch resistance test The surface of a test piece was scratched lightly with a commercially available calling card and then the surface was observed.
O: Little scratch
X: Remarkable scratches

TABLE 3

| Silyl group-containing vinyl resins | Curing agents | | Additive agents | |
|---|---|---|---|---|
| | Kinds | Used amount (Parts) *1 | Kinds | Used amount (Parts) *1 |
| Com. Ex. 1 Pre. Ex. 1 | Dibutyl phosphate *2 | 1.5 | — | |
| Com. Ex. 2 Pre. Ex. 1 | " | " | Polyethylene wax | 5.0 |
| Com. Ex. 3 Pre. Ex. 3 | " | 1.0 | — | |
| Com. Ex. 4 Pre. Ex. 3 | " | " | Polyethylene wax | 5.0 |
| Ex. 1 Pre. Ex. 2 | " | 1.5 | — | |
| Ex. 2 Pre. Ex. 2 | " | " | Polyethylene wax | 5.0 |
| Ex. 3 Pre. Ex. 4 | " | 1.5 | — | |
| Ex. 4 Pre. Ex. 4 | " | " | Polyethylene wax | 5.0 |
| Ex. 5 Pre. Ex. 5 | " | 1.5 | — | |
| Ex. 6 Pre. Ex. 5 | " | " | Polyethylene wax | 5.0 |
| Ex. 7 Pre. Ex. 6 | " | 1.0 | " | 5.0 |
| Ex. 8 Pre. Ex. 7 | " | " | " | 5.0 |
| Ex. 9 Pre. Ex. 8 | " | " | " | 5.0 |
| Ex. 10 Pre. Ex. 9 | " | " | — | |
| Ex. 11 Pre. Ex. 10 | " | " | Polyethylene wax | 5.0 |
| Ex. 12 Pre. Ex. 11 | " | " | — | |
| Ex. 13 Pre. Ex. 12 | " | " | Polyethylene wax | 5.0 |
| Ex. 14 Pre. Ex. 13 | " | " | — | |

| | Abrasion resistance test | | | Percentage of (meth)acrylic |
|---|---|---|---|---|
| | Abrasion resistance | Scratch resistance | Adherence | acid alkyl ester (%) |
| Com. Ex. 1 | — | X | 0 | 0 |
| Com. Ex. 2 | X | X to Δ | 4 to 5 | 0 |
| Com. Ex. 3 | — | X | 2 to 8 | 0 |
| Com. Ex. 4 | X | X | 6 to 7 | 0 |
| Ex. 1 | — | X to Δ | 9 | 19 |
| Ex. 2 | O | O | 10 | 19 |
| Ex. 3 | — | X to Δ | 10 | 19 |
| Ex. 4 | Δ | O | 10 | 19 |
| Ex. 5 | — | Δ | 10 | 28 |
| Ex. 6 | O | O | 10 | 28 |
| Ex. 7 | Δ | Δ to O | 8 | 5.0 |
| Ex. 8 | O | O | 9 | 9.4 |
| Ex. 9 | O | O | 9 | 9.4 |
| Ex. 10 | — | Δ | 10 | 19 |
| Ex. 11 | Δ | O | 9 | 9.4 |
| Ex. 12 | — | Δ | 9 | 19 |
| Ex. 13 | O | O | 10 | 9.4 |
| Ex. 14 | — | Δ to O | 9 | 19 |

*1 Parts by weight of Dibutyl phosphate against 100 parts by weight of the obtained silyl group-containing vinyl resin
*2 Commercially available under the trade mark "DP-4" made by Daihachi Kagakukogyosha The number of remaining squares were counted For

TABLE 4

| Silyl group-containing vinyl resins | Curing agents | | Additive agents | |
|---|---|---|---|---|
| | Kinds | Used amount (Parts) *1 | Kinds | Used amount (Parts) *1 |

TABLE 4-continued

| | | | | |
|---|---|---|---|---|
| Com. Ex. 1 Pre. Ex. 1 | DOTM *2 | 1.5 | — | |
| Com. Ex. 2 Pre. Ex. 1 | DBTL *3 | 1.5 | — | |
| Com. Ex. 3 Pre. Ex. 1 | DBTL | 1.5 | Polyethylene wax *4 | 5.0 |
| Com. Ex. 4 Pre. Ex. 1 | Dibutyl phosphate | 1.0 | Polycarbonate wax *5 | 5.0 |
| Com. Ex. 5 Pre. Ex. 1 | " | 1.0 | Silica flatting agent *6 | 7.5 |
| Ex. 1 Pre. Ex. 2 | DOTM | 1.5 | — | |
| Ex. 2 Pre. Ex. 2 | DBTL | 1.5 | — | |
| Ex. 3 Pre. Ex. 2 | DBTL | 1.5 | Polyethylene wax | 5.0 |
| Ex. 4 Pre. Ex. 2 | Dibutyl phosphate | 1.0 | Polycarbonate wax | 5.0 |
| Ex. 5 Pre. Ex. 2 | " | 1.0 | Silica flatting agent | 7.5 |

| | Abrasion resistance test | | | Percentage of (meth)acrylic |
|---|---|---|---|---|
| | Abrasion resistance | Scratch resistance | Adherence | acid alkyl ester (%) |
| Com. Ex. 1 | X | X | 0 | 0 |
| Com. Ex. 2 | X | X | 0 to 1 | 0 |
| Com. Ex. 3 | X | X to Δ | 5 to 7 | 0 |
| Com. Ex. 4 | X | X to Δ | 5 to 7 | 0 |
| Com. Ex. 5 | X | Δ | 2 to 4 | 0 |
| Ex. 1 | — | Δ | 9 | 19 |
| Ex. 2 | — | Δ | 9 | 19 |
| Ex. 3 | O | O | 10 | 19 |
| Ex. 4 | O | O | 10 | 19 |
| Ex. 5 | O | O | 10 | 19 |

*1 Parts by weight of Dibutylphosphate against 100 parts by weight of the obtained silyl group-containing vinyl resin.
*2 Dioctylstannio maleate
*3 Dibutylstannio laurate
*4 Commercially available under the trade mark "Hi fratto" made by Gifu Shellac Seizosho
*5 Commercially available under the trade mark "Hi fratto" made by Gifu Shellac Seizosho
*6 Commercially available under the trade mark "Aerosyl R972" made by Nippon Aerosyl Co., Ltd.

What we claim is:

1. In a liquid paint having a non-aqueous solvent and which is capable of curing to a hard finish, the improvement comprising producing increased adhesion and weatherability by including a silyl group-containing vinyl resin as an effective component, said resin having a molecular weight of 500 to 100,000, the main chain of which is formed by polymerizing 9 to 19% by weight of a silane monomer having an hydrolyzable group bonded thereto, 1 to 28% by weight of a monomer selected from the group consisting of an acrylic acid alkyl ester and a methacrylic acid ester, said alkyl having not less than 10 carbon atoms, and the remainder being at least one different vinyl monomer.

2. In a liquid coating material having a non-aqueous solvent and which is capable of curing to a hard finish, the improvement comprising producing increased adhesion and weatherability by including a silyl group-containing vinyl resin as an effective component, said resin having a molecular weight of 500 to 100,000 the main chain of which is formed by polymerizing 9 to 19% by weight of a silane monomer having an hydrolyzable group bonded thereto, 1 to 28% by weight of a monomer selected from the group consisting of an acrylic acid alkyl ester and a methacrylic acid ester, said alkyl having not less than 10 carbon atoms, and the remainder being at least one different vinyl monomer.

3. In a liquid paint having a non-aqueous solvent and which is capable of curing to a hard finish, the improvement comprising producing increased adhesion and weatherability by including a silyl group-containing vinyl resin as an effective component, said resin having a molecular weight of 500 to 100,000, the main chain of which is formed by polymerizing 9 to 19% by weight of a silane monomer having an hydrolyzable group bonded thereto, 1 to 28% by weight of a monomer selected from the group consisting of an acrylic acid alkyl ester and a methacrylic acid ester, said alkyl having not less than 10 carbon atoms, and the remainder being at least one different vinyl monomer and 0.5 to 20 parts by weight of a delustering agent.

4. In a liquid coating material having a non-aqueous solvent and which is capable of curing to a hard finish, the improvement comprising producing increased adhesion and weatherability by including a silyl group-containing vinyl resin as an effective component, said resin having a molecular weight of 500 to 100,000, the main chain of which is formed by polymerizing 9 to 19% by weight of a silane monomer having an hydrolyzable group bonded thereto, 1 to 28% by weight of a monomer selected from the group consisting of an acrylic acid alkyl ester and a methacrylic acid ester, said alkyl having not less than 10 carbon atoms, and the remainder being at least one different vinyl monomer and 0.5 to 20 parts by weight of a delustering agent.

5. A paint according to claim 1, wherein 7 to 12% by weight, based on the total weight of the composition, of said different vinyl monomer is styrene.

6. A paint according to claim 2, wherein 7 to 12% by weight, based on the total weight of the composition, of said different vinyl monomer is styrene.

7. A paint according to claim 3, wherein 7 to 12% by weight, based on the total weight of the composition, of said different vinyl monomer is styrene.

8. A paint according to claim 4, wherein 7 to 12% by weight, based on the total weight of the composition, of said different vinyl monomer is styrene.

9. The paint according to claim 1, wherein said non-aqueous solvent is one or more hydrocarbon solvent.

10. The paint according to claim 2, wherein said non-aqueous solvent is one or more hydrocarbon solvent.

11. The paint according to claim 3, wherein said non-aqueous solvent is one or more hydrocarbon solvent.

12. The paint according to claim 4, wherein said non-aqueous solvent is one or more hydrocarbon solvent.

13. The paint of claim 1, wherein said alkyl has 10 to 30 carbon atoms.

14. The coating material of claim 2, wherein said alkyl has 10 to 30 carbon atoms.

* * * * *